(12) United States Patent
Kinoshita

(10) Patent No.: US 6,714,638 B1
(45) Date of Patent: Mar. 30, 2004

(54) TERMINAL ADAPTER

(75) Inventor: Kentoku Kinoshita, Tokyo (JP)

(73) Assignee: Sophia International Co., Ltd., Tokyo (JP)

( * ) Notice: Subject to any disclaimer, the term of this patent is extended or adjusted under 35 U.S.C. 154(b) by 0 days.

(21) Appl. No.: 09/456,815

(22) Filed: Dec. 8, 1999

(30) Foreign Application Priority Data

Dec. 10, 1998 (JP) ............................................ 10-351884
Dec. 10, 1998 (JP) ............................................ 10-351885

(51) Int. Cl.[7] .............................................. H04M 3/00
(52) U.S. Cl. ........................... 379/221.02; 379/221.14; 379/114.02
(58) Field of Search ....................... 379/114.02, 221.02, 379/221.14

(56) References Cited

U.S. PATENT DOCUMENTS 5,963,637 A  * 10/1999  Arzoumanian ......... 379/357.03
6,128,291 A  * 10/2000  Perlman et al. ........ 379/114.02
6,330,311 B1 * 12/2001  Mijares et al. ......... 379/112.01

* cited by examiner

*Primary Examiner*—Minsun Oh Harvey
*Assistant Examiner*—Daniel Swerdlow
(74) *Attorney, Agent, or Firm*—Frishauf, Holtz, Goodman & Chick, P.C.

(57) ABSTRACT

A terminal adapter (10) includes a transmit/receive control section (17) for controlling telecommunication between a user terminal device (20) and another user terminal device line-connected to the terminal adapter (10) through a selected one of particular telecommunication networks respectively provided by particular common carriers with which a user made a service contract, and a memory device (19) for storing a table indicating adapter-operating conditions including exchange identification numbers respectively specifying particular exchanges respectively provided in the particular telecommunication networks. The transmit/receive control section (17) selects, in response to manual input of a called party's telephone number through the user terminal device, one of the particular telecommunication networks or a public telecommunication network, and reads out, when one of the particular telecommunication networks is selected, the exchange identification number corresponding to the selected network from the table stored in the memory device (19) and delivers the same.

12 Claims, 14 Drawing Sheets

FIG. 3

OPERATION MODE TABLE

TELEPHONE FOR FIRST ANALOG PORT

☐ DIRECT PHONE

☐ ADDITION PHONE

☐ ROUTING PHONE

TELEPHONE FOR SECOND ANALOG PORT

☐ DIRECT PHONE

☐ ADDITION PHONE

☐ ROUTING PHONE

FIG. 4

ADDITION PHONE TABLE

TELEPHONE FOR FIRST ANALOG PORT

TELEPHONE FOR SECOND ANALOG PORT

FIG. 7

ROUTING PHONE TABLE

☐ ROUTING-ORDER DESIGNATION

☐ AUTOMATIC ROUTING

| ① | | ⑥ |
|---|---|---|
| ② | | ⑦ |
| ③ | | ⑧ |
| ④ | | ⑨ |
| ⑤ | | ⑩ |

FIG. 8

SUPPLEMENTARY INFORMATION TABLE

| NCC ID | CALLER ID | PASSWORD |
|---|---|---|
| | | |
| | | |
| | | |
| | | |
| | | |
| | | |

FIG. 9

| TOLL TABLE | | | | | | | | | | | | | | |
|---|---|---|---|---|---|---|---|---|---|---|---|---|---|---|
| CLASSI-FICA-TION \ NCC ID | WEEKDAY | | | | | | | | SUNDAY/HOLIDAY | | | | | |
| | DAYTIME | | | | NIGHT | | | | DAYTIME | | | | NIGHT | |
| | LOCAL | TOLL | OVER-SEAS | INTER-NET | LOCAL | TOLL | OVER-SEAS | INTER-NET | LOCAL | TOLL | OVER-SEAS | INTER-NET | LOCAL | TOLL | OVER-SEAS | INTER-NET |
| | | | | | | | | | | | | | | |
| | | | | | | | | | | | | | | |
| | | | | | | | | | | | | | | |
| | | | | | | | | | | | | | | |
| | | | | | | | | | | | | | | |

TERMINAL ADAPTER

BACKGROUND OF THE INVENTION

1. Field of the Invention

The present invention relates to a terminal adapter through which a terminal device is connected to a telecommunication network, and more particularly, to a terminal adapter permitting a user to selectively and easily utilize telecommunication networks respectively provided by telecommunication enterprises with which the user made a service contract.

2. Related Art

In addition to public telecommunication networks provided by a primary telecommunication enterprise (hereinafter referred to as "common carrier" or "CC") such as Nippon Telegraph and Telephone Co., a variety of telecommunication networks (hereinafter referred to as "NCC networks") accessible to various users have been provided by other telecommunication enterprises (hereinafter referred to as "new common carriers" or "NCCs").

To produce an outgoing call to establish a line connection via a particular NCC network, the user dials an enterprise identification number [00XX] (hereinafter referred to as "NCC identification number") which specifies such a particular NCC, and then dials a called party's telephone number. Some of terminal adapters, each serving to connect a user terminal device such as a telephone to a digital telecommunication network, have an auto-dialing function. When a called party's telephone number is dialed through a dial button operation on the terminal device, a terminal adapter having an auto-dialing function automatically delivers an NCC identification number prior to the delivery of the called party's telephone number. In response to the delivery of the NCC identification number, a local switching system is connected to a toll switch selected by the local switching system, and then the toll switch is connected to an inter-gateway switch selected by the toll switch. Further, the inter-gateway switch is connected to an NCC exchange selected by the inter-gateway switch based on the NCC identification number, whereby the terminal adapter is connected to the NCC exchange through the public network. Subsequently, procedures to establish a line connection between the terminal adapter and a called party's terminal device though the public network and the NCC network are started.

The function of automatically delivering an NCC identification number is convenient for users who wish to utilize NCC networks. However, connection procedures, performed after the delivery of the NCC identification number, to establish a line connection between the terminal adapter and the NCC exchange through various exchanges are complicated, to lengthen a period of time required for establishing the line connection and to increase telecommunication costs. Furthermore, some NCCs request users to deliver supplementary information such as a caller ID and/or a password attained by an individual user who made a service contract with these NCCs. It is burdensome for users to operate dial buttons and the like to input the supplementary information each time they use a telephone. In particular, those users who made a service contract with a plurality of NCCs are requested to make a burdensome operation of inputting the supplemental information which varies from one NCC to another NCC.

In order to selectively utilize NCC networks with the aid of an automatic dialing function, the provision of terminal adapters is needed, which adapters respectively correspond to the NCC networks and are connected to the subscriber line through a switching device or through a switching device and a digital service unit. To utilize a particular NCC network, a user should select a required one of the terminal adapters in advance by operating the switching device, if necessary.

Moreover, in order to realize a telecommunication system for establishing a line connection through an NCC network and part of the CC network in response to the delivery of an NCC identification number, NCCs are required to obtain approval for usage of their NCC identification numbers from a government office and to ask the CC to register the NCC identification numbers in a numerous number of CC exchanges, prior to the start of operations of their telecommunication networks. In addition, after using an NCC network, an individual user pays a high-priced fee for services rendered by the CC for connecting a user's terminal device to the NCC network.

It is advisable to select a low-toll NCC network by comparing tolls to be paid to respective NCC networks, thereby reducing telecommunication costs. In this respect, toll information associated with each NCC can be downloaded through a personal computer connected to a terminal adapter. However, such a download operation is burdensome and difficult to be done in a timely fashion.

In the present specification, the term "particular common carrier" indicates a common carrier with which an individual user made a service contact. The term "particular telecommunication network" indicates network provided by a particular common carrier, and the term "particular exchange" indicates an exchange provided, typically on the side close to a subscriber line, in a particular telecommunication network.

SUMMARY OF THE INVENTION

An object of the present invention is to provide a terminal adapter capable of relieving a user of labor of manually operating a terminal device such as telephone, required at the time of producing an outgoing call to establish a line connection via an arbitrary one of a plurality of telecommunication networks respectively provided by different particular common carriers with which the user made a service contract, and capable of promptly establishing a line connection between the terminal adapter and a particular telecommunication network at low costs in term of simplified connection procedures.

Another object of the present invention is to provide a terminal adapter which eliminates the need of a user's manual operation to input supplementary information, such as a caller ID and a password, which is to be delivered when requested by an exchange provided in a particular telecommunication network through which the user wishes to establish a line connection.

A further object of the present invention is to provide a terminal adapter which permits the selection of an appropriate network among a plurality of telecommunication networks in the order specified by a user in advance or in an ascending order of toll.

A still further object of the present invention is to provide a terminal adapter capable of permitting an individual common carrier to download its structured toll information to the terminal adapter on the initiative of the common carrier, thereby constructing a toll database, proper to an individual user, in the terminal adapter.

A further object of the present invention is to provide a terminal adapter the setup of which can be made by a remote control via telecommunication networks.

According to the present invention, there is provided a terminal adapter including a transmit/receive control section for controlling telecommunication between a user terminal device connected to the terminal adapter and another user terminal device line-connected to the user terminal device through a selected one of particular telecommunication networks respectively provided by particular common carriers with which a user made a service contract.

The terminal adapter of the present invention comprises a memory device for storing at least one table indicating adapter-operating conditions for determining operations of the terminal adapter. The adapter-operating conditions include a plurality of exchange identification numbers respectively specifying particular exchanges respectively provided in the particular telecommunication networks. In response to manual input of a called party's telephone number through the user terminal device, the transmit/receive control section selects one of the plurality of particular telecommunication networks or a public telecommunication network, and reads out, when one of the particular telecommunication networks is selected, the exchange identification number corresponding to the selected particular telecommunication network from the at least one table stored in the memory device and delivers the same.

According to the terminal adapter of the present invention, when one of particular telecommunication networks, respectively provided by the particular common carriers with which a user made a service contract, is selected in response to the input of a called party's telephone number through a user terminal device such as a telephone, an exchange identification number such as an exchange telephone number associated with the particular telecommunication network is delivered from the transmit/receive control section of the terminal adapter. In response to the delivery of the exchange identification number, a telecommunication path, through which the terminal adapter is connected to a particular exchange provided in a particular telecommunication network selected in accordance with the called party's telephone number, is promptly established in the public telecommunication network. In this manner, by delivering an exchange identification number from the transmit/receive control section upon utilization of a particular telecommunication network, a line connection between the terminal adapter and an exchange provided in the particular telecommunication network is promptly established in term of simplified connection procedures as compared to a case where a common carrier identification number is delivered, so that a period of time required for establishment of a line connection may be shortened to thereby reduce telecommunication costs. Further, a user is not required to manually operate a user terminal device in order to input a common carrier identification number or an exchange identification number. Moreover, the particular common carries can operate their telecommunication networks without common carrier identification numbers, so that they are not required to obtain, prior to the start of operations of their networks, approval for common carrier identification numbers from a government office and to ask the common carrier to register identification numbers in a numerous number of exchanges provided in the public network, whereby enormous amounts of cost and time required therefor can be eliminated. Although fee for public network services incurs during usage of a network provided by a particular common carrier, the present invention can reduce such fee.

In the present invention, preferably, a particular exchange, provided in a particular telecommunication network provided by at least one of the plurality of particular common carries, receives, as supplementary information, a user telephone number assigned to the user terminal device, and determines whether the particular telecommunication network is useable by the user terminal device based on the user telephone number received as the supplementary information. When the user terminal device is taken off-hook, the user telephone number is delivered from an exchange provided in the public telecommunication network or from the transmit/receive control section which reads the user telephone number to be delivered, from the memory device of the terminal adapter.

Some common carriers request the user terminal device to deliver supplementary information such as a caller ID upon utilization of telecommunication networks provided by them, and determine whether their telecommunication networks are useable by the user terminal device based on received supplementary information. According to the just-mentioned preferred arrangement, when the user terminal device is taken off-hook, the user telephone number is delivered as supplementary information from an exchange provided in the public telecommunication network or from the transmit/receive control section of the terminal adapter. Upon establishment of a line connection via an NCC telecommunication network, an NCC exchange is notified of the user telephone number as supplementary information such as a caller ID, as mentioned above, to be permitted to confirm whether the NCC telecommunication network is useable by the user terminal device, so that burdensome negotiating procedures upon establishment of a line connection may be implemented smoothly. The user terminal device becomes easy to handle since the need of a burdensome user's operation of inputting the supplementary information through the user terminal device each time the line connection via an NCC network is made is eliminated.

In the just-mentioned preferred arrangement, the particular exchange may receive both the telephone numbers respectively delivered from an exchange provided in the public telecommunication network and from the transmit/receive control section, and may prohibit utilization of the telecommunication network by the user terminal device if both the telephone numbers are inconsistent with each other, whereby unauthorized utilization of the NCC network by the user terminal device connected to an improper subscriber line, for instance, can be prevented.

In the present invention, preferably, the memory device stores therein a supplementary information table in which a common carrier name or a common carrier identification number or an exchange identification number in respect of at least one particular common carrier is associated with supplementary information requested to be delivered upon utilization of a particular telecommunication network provided by the at least one particular common carrier. The transmit/receive control section reads out supplementary information from the supplementary information table and delivers the same in response to a supplementary-information delivery request made by an exchange provided in the selected one of the particular telecommunication networks.

With this preferred arrangement, when a supplementary-information delivery request is made, in response to the delivery of the exchange identification number, by a particular exchange provided in the particular telecommunication network associated with the delivered exchange identification number, the requested supplementary information is delivered from the transmit/receive control section. To produce an outgoing call for a line connection of the user terminal device, the user is not required to manually operate the user terminal device to input the supplementary information.

In the present invention, preferably, the memory device stores therein a routing phone table in which exchange identification numbers respectively associated with the plurality of particular common carriers are listed. In response to manual input of a called party's telephone number through the user terminal device, the transmit/receive control section sequentially delivers the exchange identification numbers in the order listed in the routing phone table until a dial tone, indicating that an exchange is ready for telephone number input, is returned from the exchange, and delivers the manually input called party's telephone number when a dial tone is returned.

With this preferred arrangement, an attempt is made to establish a line connection via a telecommunication network to which the highest utilization priority is given by the user. If no dial tone is returned, an attempt is made to establish a line connection via another telecommunication network to which the next higher priority is given.

More preferably, the transmit/receive control section delivers the manually input called party's telephone number if no dial tone is returned in response to the delivery of the exchange identification number listed at the end of the routing phone table.

With this preferred arrangement, the line connection via the public telecommunication network is initiated when no dial tone is returned even if the sequential delivery of all the exchange identification numbers listed in the routing phone table, so that the user is not required to manually operate the user terminal device to re-input the called party's telephone number.

Preferably, the memory device stores therein a routing phone table in which exchange identification numbers respectively associated with the plurality of particular common carriers are listed and a toll table in which pieces of structured toll information in respect of telecommunication networks, respectively provided by the plurality of particular common carriers, are associated with network-utilization conditions and common carrier names or common carrier identification numbers or exchange identification numbers. In response to manual input of a called party's telephone number through the user terminal device, the transmit/receive control section sequentially delivers the exchange identification numbers listed in the routing phone table in the order determined based on the toll table until a dial tone, .indicating that an exchange is ready for telephone number input, is returned from the exchange, and delivers the manually input called party's telephone number when a dial tone is returned. More preferably, the transmit/receive control section delivers the manually input called party's telephone number if no dial tone is returned in response to the delivery of the exchange identification number lastly determined based on the toll table.

With this preferred arrangement, an attempt is made to establish a line connection via the lowest-toll telecommunication network, and if no dial tone is returned, an attempt is made to establish a line connection via the next lower-toll telecommunication network, thereby reducing telecommunication costs. Further, a line connection via the public telecommunication network can be started, where required.

Preferably, the memory device stores therein an operation mode table in which any one of a direct phone mode, an addition phone mode and a routing phone mode is indicated as a selected operation mode of the user terminal device, a direct phone table for storing therein a called party's telephone number including, where required, one or ones of a country code for international call, a toll area code, and an exchange identification number, an addition phone table for storing therein one or ones of a country code for international call, a toll area code, and a common carrier identification number, a routing phone table in which exchange identification numbers respectively associated with the plurality of particular common carriers are listed, and a toll table in which structured toll information in respect of the telecommunication networks, respectively provided by the plurality of particular common carriers, are associated with network-utilization conditions and common carrier names or common carrier identification numbers or exchange identification number. The transmit/receive control section determines the selected operation mode with reference to the operation mode table when the user terminal device is taken off-hook, and immediately delivers the called party's telephone number stored in the direct phone table if the direct phone mode is selected. If the addition phone mode is selected, the transmit/receive control section delivers, in response to manual input of a called party's telephone number through the user terminal device, the number stored in the addition phone table, and then delivers the manually input called party's telephone number. If the routing phone mode is selected, the transmit/receive control section sequentially delivers, in response to manual input of a called party's telephone number through the user terminal device, the exchange identification numbers listed in the routing phone table in the order listed in the routing phone table or determined based on the toll table, until a dial tone indicating that an exchange is ready for telephone number input is returned from the exchange. The transmit/receive control section delivers the manually input called party's telephone number when a dial tone is returned.

With this preferred arrangement, the operation mode of the terminal adapter and hence the operation mode of the user terminal device can be adapted to a way in which an individual user utilizes telecommunication networks and can be changed where required. Typically, the direct phone mode is provided for emergency use, in which a called party's telephone number for emergency contact can be delivered only by off-hooking the user terminal device (user telephone), thereby calling up a called party's telephone. The addition phone mode is provide for auto transmission of a common carrier identification number, in which an NCC telecommunication network can be utilized by manually inputting a called party's telephone number. The routing phone mode is provided for selectively and easily utilizing NCC telecommunication networks.

More preferably, the routing phone table includes check boxes for routing-order designation and automatic routing. The transmit/receive control section sequentially delivers the exchange identification numbers listed in the routing phone table in the order listed in the routing phone table if the check box associated with the routing-order designation is marked or in the order determined based on the toll table if the check box associated with the automatic routing is marked, until a dial tone indicating that an exchange is ready for telephone number input is returned from the exchange. More preferably, the transmit/receive control section delivers the manually input called party's telephone number if no dial tone is returned in response to the delivery of the exchange identification number listed at the end of the routing phone table or lastly determined based on the toll table.

With this preferred arrangement, the order of network selection for selective utilization of the plurality of particular telecommunication networks can be properly set in advance in accordance with the intention of an individual user.

More preferably, the memory device stores therein a phone table in which telephone numbers, for which a public telecommunication network should be utilized, or area codes including a user's local area code, or common carrier identification numbers are listed. The transmit/receive control section delivers the called party's telephone number manually input through the user terminal device, without delivering a toll area code or a common carrier identification number, if the manually input called party's telephone number or its several highest-order digits is/are coincide with any one of the telephone numbers, the area codes, and the common. carrier identification numbers listed in the phone table.

With this preferred arrangement, a line connection via the public telecommunication network is immediately started, e.g., if a called party's telephone number for which the public telecommunication network should be utilized is input. Further, there is no fear that a common carrier identification number for which the user did not make a service contract is delivered.

Preferably, the terminal adapter of the present invention further includes an adapter management section which is accessible to the memory device. The adapter management section causes a download memory area of the memory device to store therein structured toll information delivered from a toll database system associated with any one of the plurality of particular common carriers when access is made from the toll database system with intention of delivering the structured toll information. The adapter management section converts the downloaded structured toll information into a toll-table form, and prepares or renews, with use of the structured toll information converted into the toll-table form, the toll table in which structured toll information in respect of the telecommunication networks, respectively provided by the plurality of particular common carriers, are associated with network-utilization conditions and common carrier names or common carrier identification numbers.

With this preferred arrangement, a toll table proper to an individual user can be prepared and renewed with use of the structured toll information in respect of particular common carriers with which the user made a service contract in advance. The lowest-toll telecommunication network can be selected based on this toll table, to thereby reduce telecommunication costs. The toll table includes the toll information which is required and sufficient for the user to select an optimum telecommunication network, but does not include redundant toll information regarding common carriers with which the user did not make a service contract, whereby the memory capacity required for storage of the toll table can be reduced and the selection of an optimum telecommunication network based on the toll table can be made promptly. In addition, the downloading of the latest toll information to the terminal adapter can be made in a timely fashion on the initiative of respective common carriers, so that a burdensome downloading operation on the user side by using a personal computer or the like can be eliminated.

Preferably, when access is made from a server, provided in a service center associated with the terminal adapter, to the terminal adapter, with intention of making the initial setting or renewal of the at least one table stored in the memory device, the adapter management section delivers, through the transmit/receive control section, a reply signal indicating that access from the server to the memory device through telecommunication networks is accepted.

With this preferred arrangement, at the occasion of the initial setting or renewal of the at least one table in the memory device of the terminal adapter, a server provided in the service center serves as the master and the terminal adapter serves as the slave. Typically, the at least one table in the terminal adapter or an equivalent table is displayed on a display screen of the server. Then, data input into various setting fields in the table displayed on the screen is implemented in sequence by a staff member of the service center by manually operating an input device of the server. Each time individual data is manually input, such data is written into a corresponding field in the at least one table in the terminal adapter and at the same time the same data is written into the same field in an equivalent table provided in a memory device of the server. In other words, the writing of table data into the terminal adapter and the server is implemented in a mirroring fashion. Thus, an individual user is not required to carry out an operation for the initial setting and renewal of the at least one table in the terminal adapter. In addition, the same data can be retained in the table provided in the server and equivalent to the table in the terminal adapter, so that the service center may have backup against data destruction in the table of the terminal adapter. Typically, the initial setting and renewal of the table in the terminal adapter is remotely implemented by the service center in term of communication protocol proper to the service center on the basis of a notification, associated with table data, sent from an individual user to the service center. Thus, the terminal adapter can operate in a manner to meet the intention of an individual user, and undesired rewriting of the table in the terminal adapter by outsiders can be prevented.

BRIEF DESCRIPTION OF THE DRAWINGS

FIG. 3 is a view showing an operation mode table stored in a memory device shown in FIG. 2;

FIG. 4 is a view showing an addition phone mode table stored in the memory device;

FIG. 7 is a view of a routing phone table;

FIG. 8 is a view of a supplementary information table;

FIG. 9 is a view of a toll table;

DETAILED DESCRIPTION

With reference to the appended drawings, a terminal adapter according to a preferred embodiment of the present invention will be explained hereinbelow.

Figure 1:
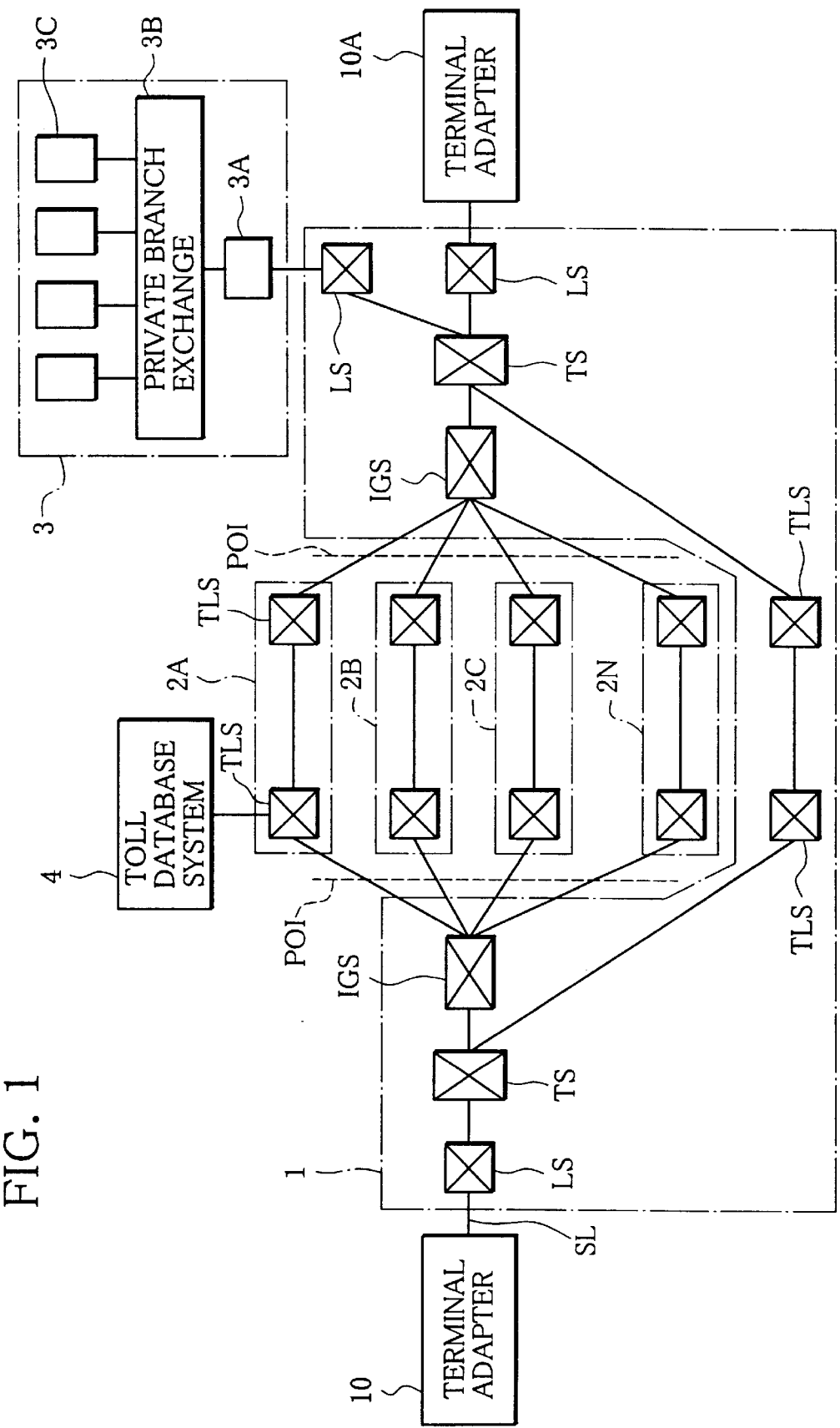
FIG. 1 is a schematic view showing a terminal adapter according to a preferred embodiment of the present invention, together with telecommunication networks to which the terminal adapter, another terminal adapter, a service center, and a toll database system are connected.

In FIG. 1, the terminal adapter 10 of the present embodiment has a function of a digital service unit DSU and is adapted to be connected to a subscriber line SL, which is connected through a local switch LS to a public telecommunication network 1, such as an integrated services digital network ISDN, provided by a telecommunication enterprise, i.e., a common carrier (hereinafter referred to as "CC"). The subscriber line SL is permitted to be connected to an arbitrary one of a plurality of telecommunication networks (hereinafter referred to as "NCC networks") 2A–2N respectively provided by a plurality of new common carriers (hereinafter referred to as "NCCs") through a toll switch TS and an inter-gateway switch IGS. Symbol TLS and POI denote a toll local switch and a point of interface, respectively. In FIG. 1, only a relevant portion of the telecommunication networks that is required for the explanation of the present embodiment is shown.

A large number of subscribers' terminal devices are connected through a number of switchboards or exchanges to the public telecommunication network 1. These terminal devices include a number of terminal adapters (one of which is shown by reference numeral 10A) of the present embodiment. In association with the setup of these terminal adapters, at least one of manufacturers and distributors of the terminal adapters has a service center 3 connected to the public telecommunication network 1. Reference numerals 3A, 3B and 3C denote a digital service unit, a private branch exchange, and a computer (server) serving as a terminal device, respectively.

Further, toll database systems (one of which is shown by reference numeral 4), each storing therein structured toll information regarding a corresponding one of the public telecommunication network 1 and the NCC networks 2A–2N, are connected to primary exchanges respectively provided in the public telecommunication network and the NCC networks.

Figure 2:
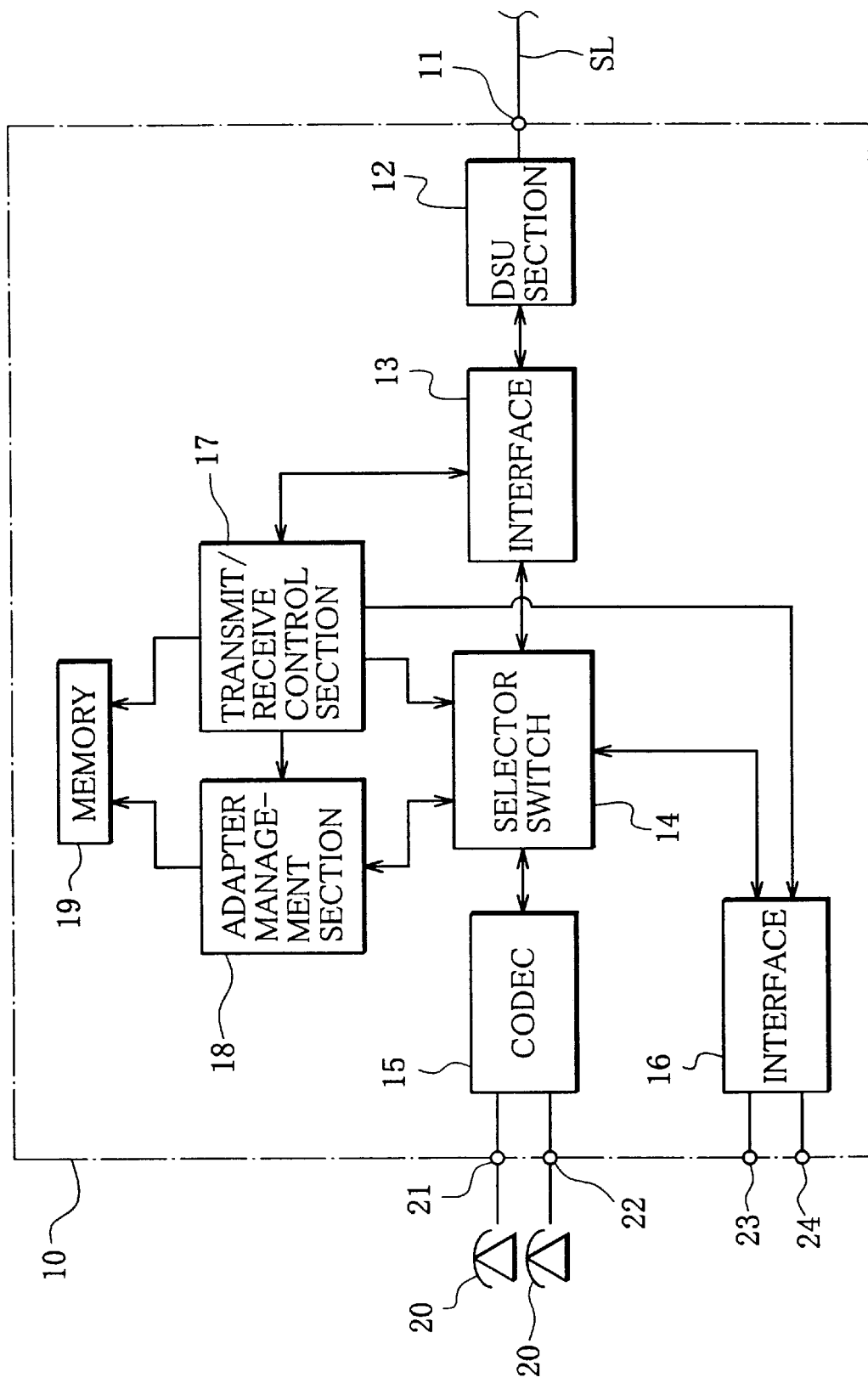
FIG. 2 is a schematic block diagram showing the internal construction of the terminal adapter shown in FIG. 1.

As shown by way of example in FIG. 2, the terminal adapter 10 of the present embodiment includes a connection port 11 adapted to be connected to a local switch LS, a DSU section 12 connected to the connection port 11 and having a function of a DSU (digital service unit), and a first interface section 13 connected to the DSU section 12 and adapted to implement synchronization and data speed conversion during the telecommunication. The first interface section 13 is connected through a selector switch 14 and a codec 15 to first and second analog ports 21, 22 each of which is adapted to be connected to a telephone 20. Further, the first interface section 13 is connected through the selector switch 14 and a second interface section 16 to a digital port 23 to which a digital terminal device is connectable and to a serial port 24 to which a personal computer or the like is connectable.

The terminal adapter 10 accommodates therein a transmit/receive control section 17 connected to the first and second interface sections 13, 16 and the selector switch 14. The control section 17 serves to control transmission and reception between a telephone 20 or a digital terminal device connected to the terminal adapter 10 and a terminal device (the terminal adapter 10A, for instance) line-connected to the terminal adapter 10 via networks concerned. Further, the terminal adapter 10 accommodates therein an adapter management section 18 connected to the selector switch 14, and a memory device 19 accessible from both the transmit/receive control section 17 and the adapter management section 18.

Preferably, the memory device 19 is comprised of a rewritable flash ROM having a storage capacity in the order of 4 to 36 Mbits. In this case, the data stored in the memory device 19 is prevented from being destroyed even if a power failure occurs or the power to the terminal adapter is turned off. Alternatively, the memory device 19 may be comprised of a SRAM having a relatively large capacity in the order of 2–10 Mbytes. In this case, a buffer region for high speed communication may be provided in the memory device 19.

The terminal adapter 10 of the present embodiment has a function of permitting each of telephones 20 respectively connected to the first and second analog ports 21, 22 to be used in a selected one of three modes, i.e., a "direct phone mode," "addition phone mode,"or"routing phone mode." In association with the mode selection, an operation mode table (shown in FIG. 3) for storing a selected operation mode of each telephone 20 is provided in the memory device 19 of the terminal adapter 10. Preferably, the terminal adapter 10 is provided with operation-mode selection switches (not shown) connected to the adapter management section 18 and manually operable by a user.

Further, the terminal adapter 10 has a function of automatically selecting, in accordance with toll, one of telecommunication networks, respectively provided by a plurality NCCs with which a user made a service contract. In association with this LCR (least cost route) selecting function, a toll table (FIG. 9) for storing pieces of structured toll information in respect of the contracted NCC networks, as a toll database proper to an individual user, is provided. Types of classifications and a maximum possible number of fields for indication of NCC identification numbers in the toll table are not limited to those shown in FIG. 9.

In the direct phone mode, the transmit/receive control section 17 of the terminal adapter 10 delivers a called party's telephone number set in advance in a direct table (FIG. 5) in the memory device 19 when the telephone 20 connected to the first or second analog port 21 or 22 is taken off-hook. Thus, it is possible to make rings of a call to the called party's telephone (more generally, a terminal device on the other end of the line) irrespective of whether the intended telecommunication belongs to local, toll, or overseas call via the public network 1 or any one of the contracted NCC networks 2A–2N.

In the addition phone mode, the transmit/receive control section 17 of the terminal adapter 10 causes an accommodated buffer memory (not shown) to store a telephone number manually input through a dial button operation on the telephone 20, and sends, if necessary and prior to the delivery of the manually input telephone number, a number stored in advance in an addition table (FIG. 4) provided in the memory device 19 while referring to a phone table (FIG. 6) in the memory device 19. This makes it possible to relieve the user of the labor to input a telephone number upon making a line connection for toll or overseas telecommunication or for telecommunication via an NCC network.

In the routing phone mode, routing-order designation or automatic routing can be selected. If the routing-order designation is selected, the transmit/receive control section 17 of the terminal adapter 10 sequentially delivers at predetermined time intervals, in response to manual input of a telephone number, a plurality of telephone numbers set in advance in a routing table (FIG. 7) in the memory device 19 in a predetermined order, while referring to the phone table, until a line connection is approved. On the other hand, if the automatic routing is selected, the transmit/receive control section 17 selects an appropriate one of the public telecommunication network 1 and the NCC networks on the basis of the toll table (FIG. 9) which is a toll database proper to an individual user. For the CC to which no identification number corresponding to an NCC identification number or an exchange identification number is assigned, an appropriate identification number is assigned in the toll table. The auto-routing permits early-establishment of line connection and a reduction in telecommunication costs. Irrespective of the telephone operation mode, the terminal adapter 10 delivers supplementary information when any one of the contracted NCC networks is utilized for line connection, while referring to supplementary information table (FIG. 8) stored in the memory device 19.

The transmit/receive control section 17 serving as a called party's device is designed to detect a caller's telephone number transmitted through a D channel of the ISDN network and a supplementary signal transmitted, if necessary, together with the caller's telephone number, when calling is made from the caller via switchboards concerned. If it is determined on the basis of the caller's telephone number and the supplementary signal that calling is made from a service center 3 with the intention of implementing the initial setting or renewal of various tables in the memory device 19 of the terminal adapter 10, the transmit/receive control section 17 connects the selector switch 14 with the adapter management section 18. The adapter management section 18 delivers a reply signal, indicating that access to the memory device 19 by the service center 3 is accepted, to the service center 3 through the transmit/receive control section 17. As a consequence, the server 3C in the service center 3 serves as the master and the terminal adapter 10 serves as the slave, so that the service center 3 is permitted to implement the initial setting or renewal of various tables in the memory device 19 as will be described hereinbelow.

If it is determined that a calling is made from any one of toll database systems of the NCCs and the CC with intention of delivering structured toll information, the transmit/receive control section 18 connects the selector switch 14 to the adapter management section 18. On the basis of the structured toll information delivered from the toll database system 4, the adapter management section 18 newly prepares at least part of the toll table shown in FIG. 9 or renews the toll table at least part of which has been already prepared, in a manner explained hereinbelow.

In general, the writing (downloading) of the structured toll information into the memory device 19 is implemented with use of a personal computer. Of course, such downloading can be implemented in the terminal adapter 10 of the present embodiment with use of a personal computer connected to the serial port 24 thereof. However, in this embodiment, the preparation and renewal of the toll table shown in FIG. 9 are implemented with the initiative on the side of the respective NCCs and the CC, as explained above. That is, the terminal adapter 10 of the present embodiment features in that the writing of the toll information is left to the NCCs and the CC. Meanwhile, the preparation and renewal of the toll table in an individual terminal adapter 10 can be made on the side of the service center 3.

Figure 16:
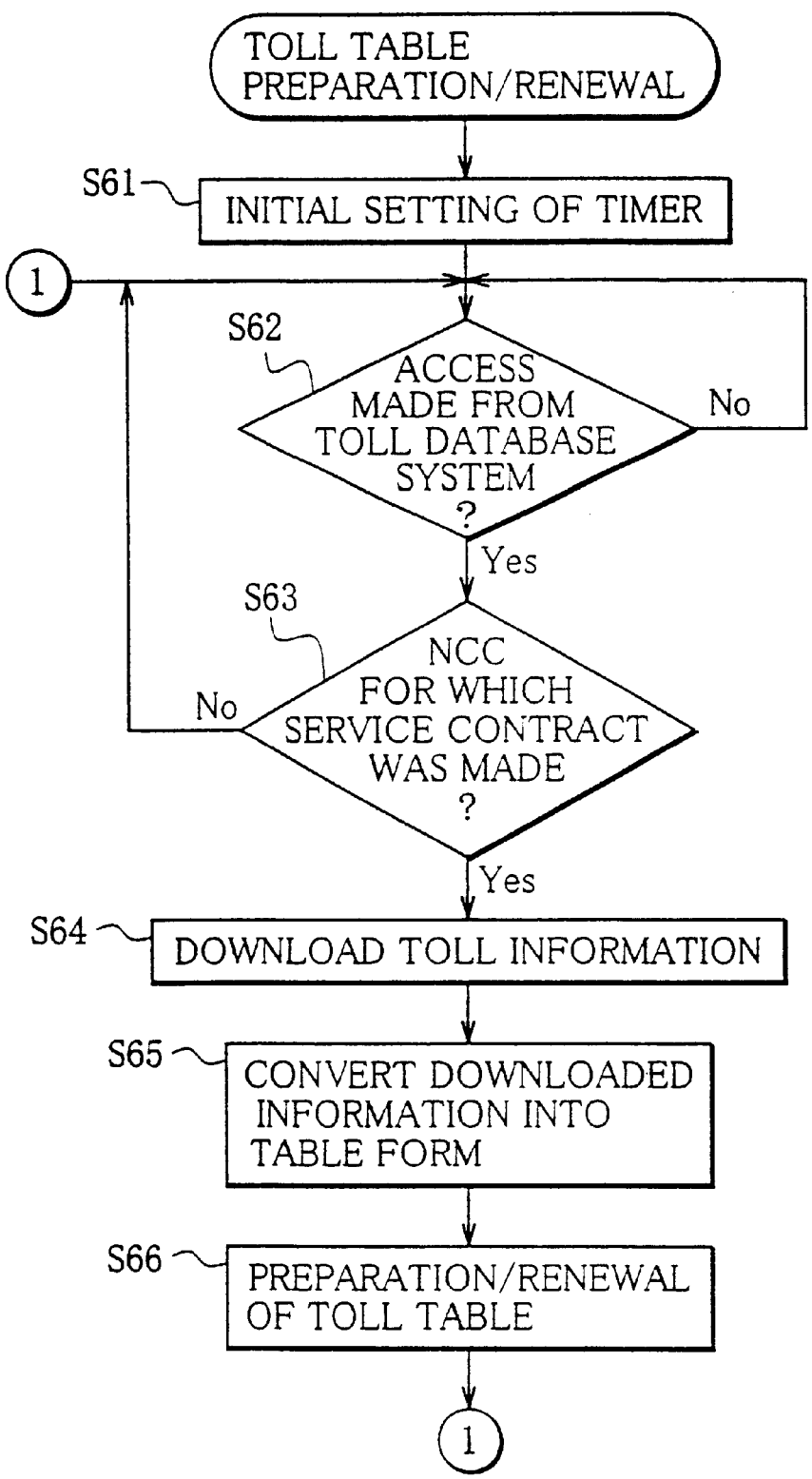
FIG. 16 is a flowchart of procedures for downloading structured toll information executed under the control of an adapter management section of the terminal adapter.

FIG. 16 shows procedures of preparation and renewal of the toll table implemented by the adapter management section 18.

In FIG. 16, the adapter management section 18 makes the initial setting of a timer (not shown) accommodated therein (step S61) when the terminal adapter 10 is installed in the user's home. The time counted by the timer is utilized for the determination of present date and time which are one of network-utilization conditions to be checked at the time of selecting an optimum network. The adapter management section 18 of the terminal adapter 10 installed in the user's home always monitors, through the transmit/receive control section 17, whether or not access is made from any one of the toll database systems 4 of the NCCs and of the CC with the intention of downloading the structured toll information to the terminal adapter 10 (step S62).

If it is determined that such access is made from any one of the toll database systems 4, the adapter management section 18 makes a determination as to whether the toll database system 4 making the access belongs to the CC or any one of the NCCs with which the user made a service contract, on the basis of the telephone number or the enterprise identification number of the toll database system 4 detected by the transmit/receive control section 17 (step S63). If it is determined that the toll database system 4 making the access is one with which the user made a service contract, the adapter management section 18 permits this toll database system 4 to make the downloading of the structured toll information to the terminal adapter 10, and stores the toll information transmitted from the toll database system 4 in a download area of the memory device 19 (step S64). Preferably, the toll information downloaded from any one of the toll database systems 4 of the CC and the NCCs is written in the download area of the memory device 19 together with the relevant NCC identification number. In the event of writing the structured toll information, if the toll information for the same NCC or CC is already registered in the download area of the memory device 19, the registered information is replaced by the newly downloaded information. The terminal adapter 10 may have a function of limiting time zones during which the downloading of toll information is permitted to late-night where the frequency of utilization of telephone is low.

Next, the adapter management section 18 converts the downloaded toll information into the form of the toll table exemplarily shown in FIG. 9 (step S65). With use of the toll information converted into the toll-table form, the adapter management section 18 prepares or renews the toll table in which pieces of structured toll information for the common carriers are associated with common carrier names or common carrier identification numbers and classified network-using conditions (step S66).

In the preparation or renewal of the toll table, the downloaded and converted toll information regarding the CC or any one of the NCCs is compared with each of the pieces of toll information regarding the CC and the NCCs set in the toll table (FIG. 9) stored in the memory device 19, thereby obtaining a consolidated and rearranged toll information regarding the common carriers. That is, as exemplarily shown as the toll table in FIG. 9, tolls for the common carriers' networks are associated with these common carriers' networks and the network-using conditions. The network-using conditions are classified in term of time classification such as days of a week and time zones and types of telecommunication such as local, toll, overseas and internet services.

The downloading of the toll information regarding the CC or any one of the NCCs is implemented on the initiative of the common carrier immediately after each common carrier has revised the schedule of charge or has started new services for users. If there is a restriction such that the billing process for charging tolls for services rendered by the common carriers should be made in accordance with the latest toll information registered in the toll table in the memory device 19, unnecessary troubles regarding fee charges from the common carriers can be avoided.

Since the common carriers can start their new services to an individual user only after the latest version of toll information is downloaded to the user's terminal adapter 10, then the downloading is implemented without a delay in order to strengthen their position by offering new services.

According to the present embodiment in which the downloading of the toll information to the terminal adapter 10 is implemented on the initiative of the common carriers, an individual user is not required to download pieces of toll information regarding the common carriers with use of a user's personal computer, so that the user can fully utilize the terminal adapter 10 without the need of special knowledge, can timely attain the latest version of toll information, and can utilize new services offered by the common carriers.

In the following, the attainment of the local area code implemented by the terminal adapter 10 will be explained, the local area code being utilized upon delivery of telephone number.

Figure 6:
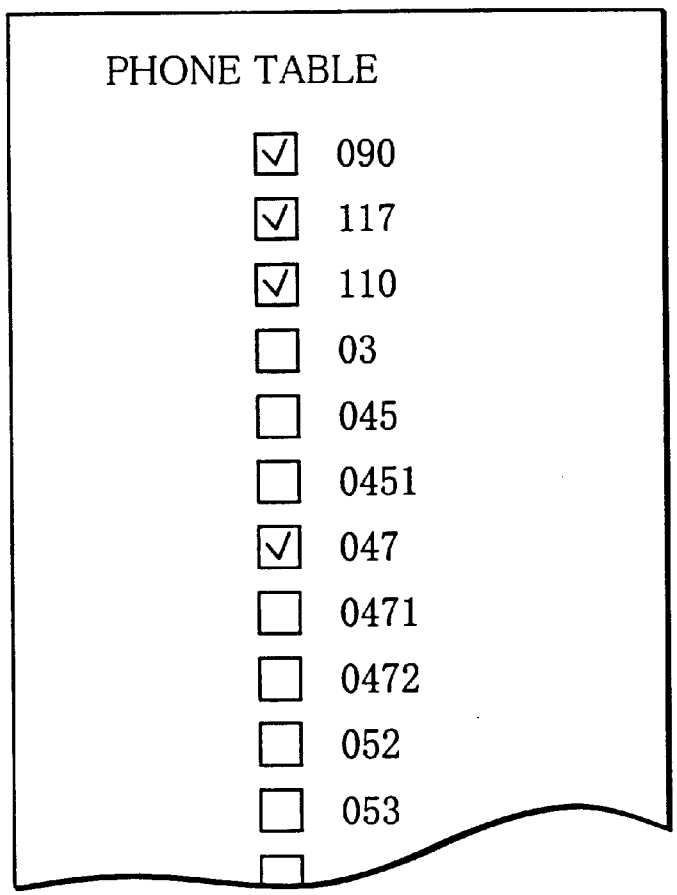
FIG. 6 is a view of a phone table.

The user connects the terminal adapter 10 installed in the user's home with the subscriber line SL and connects one or two telephones 20 with one or both of the first and second analog ports 21, 22 of the terminal adapter 10. After the installation of the terminal adapter 10, if the user off-hooks a telephone 20, the transmit/receive control section 17 (or the adapter management section 18) of the terminal adapter 10 starts a startup program (FIG. 10) accommodated therein, detects the local area code from the user's telephone number delivered from the local switchboard LS, and marks a corresponding one of check boxes on a telephone number list of a telephone table (FIG. 6).

Figure 10:
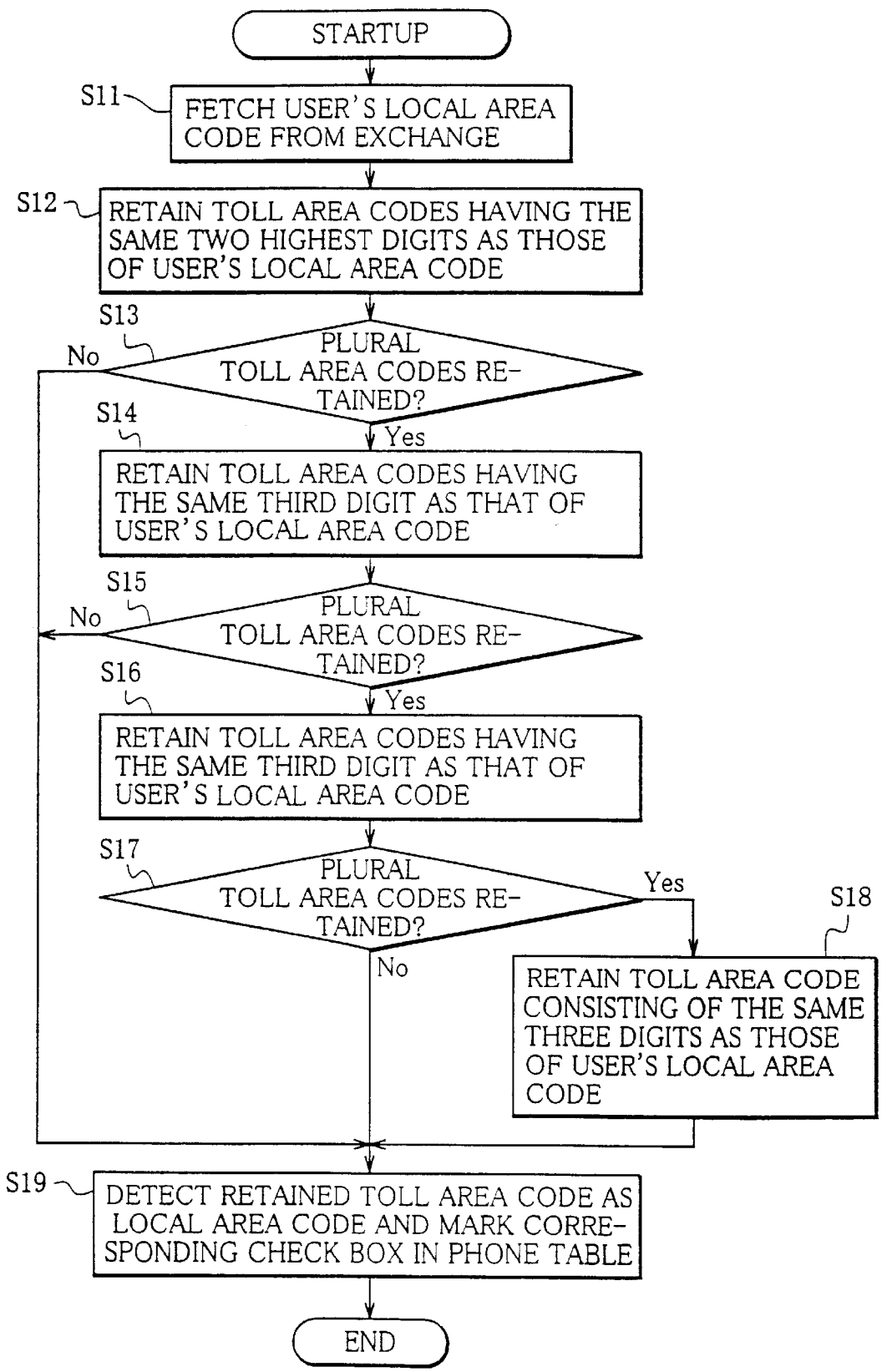
FIG. 10 is a flowchart of a startup program for detecting a local area code of a user's telephone number, executed by a transmit/receive control section of the terminal adapter after the terminal adapter is installed in the user's home.
Figure 11:
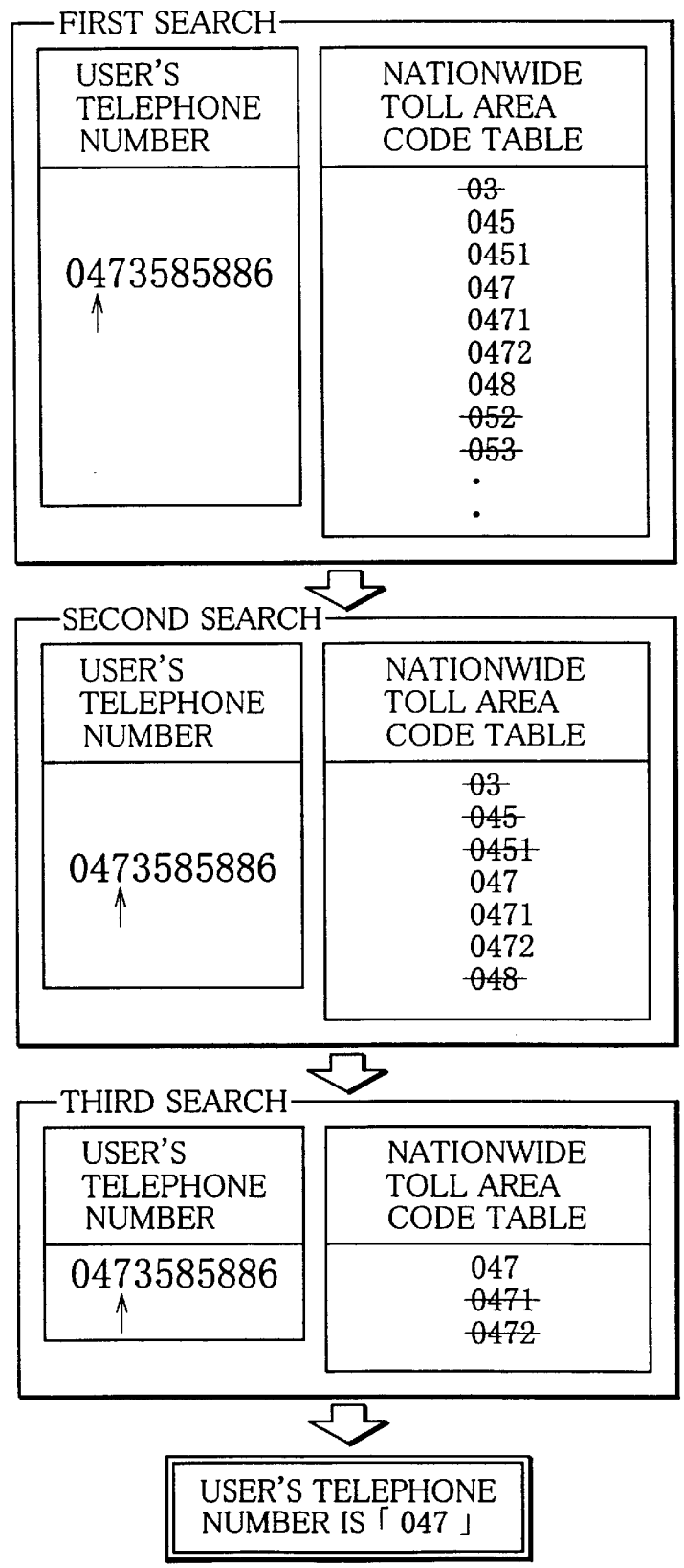
FIG. 11 is a view showing a specific example of the detection of a local area code performed by the startup program shown in FIG. 10.

More specifically, in the startup program of FIG. 10, the transmit/receive control section 17 fetches the user's telephone number ("0473585886" for the case shown in FIG. 11) delivered from the local switchboard LS when the telephone 20 is taken off-hook (step S11). With reference to a nationwide toll area code table stored in the memory device 19, the control section 17 sequentially determines whether or not the first and second highest-order digits of each of the toll area codes listed in the nationwide toll area code table are consistent with those of the user's telephone number, and retains the toll area codes each including their two highest-order digits consistent with those of the user's telephone number (step S12). Next, a determination is made as to whether or not a plurality of toll area codes are retained (step S13). If the result of this determination is affirmative, whether or not the third digit of each of the retained toll area codes is consistent with that of the user's telephone number is determined, and retains the codes each including the third digit consistent with that of the user's telephone number (step S14). Next, a determination is made as to whether or not a plurality of toll area codes are retained (step S15). If the result of this determination is affirmative, whether or not the fourth digit of each of the retained toll area codes is consistent with that of the user's telephone number is determined, and retains such codes (step S16). Further, whether or not a plurality of toll area codes are retained is determined (step S17). In this example, the toll area codes are comprised of four digits at the greatest. Thus, if the result of the determination at the step S17 is affirmative, the toll area code consisting of the three highest-order digits which are consistent with those of the user's telephone number is detected (step S18). At any one of the steps S13, S15, S17 or S18, a single toll area code is detected, so that such a toll area code is detected as the user's local area code and a check box corresponding thereto in the phone table is marked (step S19). Whereupon the startup program is completed. In the case shown in FIG. 11, the toll area code "047" is detected as the user's local area code, and the number "047" in the phone table of FIG. 6 is marked.

If the terminal adapter 10 is provided with mode selection switches, the user operates one or both of the switches to select the operation mode of one or two telephones 20, connected to the first and second analog ports 21, 22 of the terminal adapter 10, among the direct phone mode, the addition phone mode and the routing phone mode.

Further, the user notifies the service center 3 of the following particulars through the mail or by telephone.

(i) The operation mode, i.e., the direct phone, addition phone or routing phone mode set by the user for each telephone 20 connected to the terminal adapter 10. Alternatively, the operation mode of each telephone in which the user wishes to use the telephone is notified.

(ii) For the direct phone mode, a called party's telephone number is notified. Since the direct phone mode is provided with the intention of permitting the user to make a call for emergency contact, for instance, merely by taking the telephone off-hook, the called party's telephone number may include, if necessary, a desired one or ones of a country code for international call, a toll area code, an NCC identification number, and an NCC exchange telephone number. If an NCC identification number or an NCC exchange telephone number is unknown to the user, he or she may notify a corresponding NCC name to the service center 3. This applies to the following particulars.

(iii) For the addition phone mode, one or ones of a county code for international call, a toll area code, and an NCC identification number (e.g., an identification number of an international telecommunication enterprise such as KDD (Kokusai Denshin Denwa) in Japan) are notified.

(iv) For the routing phone mode, a plurality of toll area codes or NCC exchange telephone numbers are notified together with routing-order designation or automatic routing which the user wishes to use in the routing phone mode.

(v) Caller's ID and, if necessary, password for each of particular NCCs with which the user made a service contract are notified. In the present embodiment, a user's telephone number is used as a caller ID which is common to the particular NCCs. The user's telephone number is delivered from an exchange (hereinafter referred to as "CC exchange") provided in the public telecommunication network 1 to an associated NCC exchange when the telephone 20 is taken off-hook. Instead of or in combination with the delivery of the user's telephone number from the CC exchange, the transmit/receive control section 17 may read out and deliver the user's telephone number, stored in advance in a predetermined region of the memory device 19 of the terminal adapter 10, in response to a request for delivery of caller ID is made.

On the basis of the notification from the user, the service center 3 implements, in term of remote control access, the initial setting or renewal of various tables in the terminal adapter 10 in accordance with the below-mentioned procedures.

(i) A staff member of the service center 3 operates an input device of one of computer (server) 3C for terminal-adapter maintenance to call up the terminal adapter 10 through telecommunication networks, preferably, in term of communication protocol proper to the service center 3. When a reply signal indicating that access to the memory device 19 of the terminal adapter 10 from the server 3C is accepted is delivered from the adapter management section 18, the receipt of the reply signal is displayed on the display screen of the server 3C. Thus, the staff member manually operates the input device of the server 3C to implement the following work.

(ii) The staff member displays an operation mode table (FIG. 3) of the terminal adapter 10 on the screen of the computer 3C, and, in accordance with the notification from the user, marks a corresponding one of check boxes in the displayed operation mode table to indicate the operation mode, i.e., the direct phone, addition phone or routing phone mode, in which each telephone 20 connected to the terminal adapter 10 is to be used.

(iii) If the telephone 20 is to be used in the direct phone mode, the staff member operates the server 3C to write, in accordance with the notification from the user, a called party's telephone number in a direct table (FIG. 5) displayed on the display.

(iv) If the telephone 20 is to be used in the addition phone mode, the staff member operates the server 3C to write a country code or a toll area code notified by the user or an NCC identification number such as an NCC exchange telephone number corresponding to an NCC name notified by the user into an addition table (FIG. 4) and a phone table (FIG. 6) displayed on the screen of the computer 3C.

(v) If the telephone 20 is to be used in the routing phone mode, the routing phone table (FIG. 7) is displayed on the screen, and a corresponding one of check boxes associated with routing-order designation and automatic routing is marked in accordance with the user's notification. Then, NCC exchange telephone numbers are written into the routing phone table in accordance with NCC names notified by the user.

A specific example of NCC exchange telephone numbers is "0123456789" which is different from an NCC identification number [00XX]. NCC exchange telephone numbers may correspond to a free dial service or a reverse charging service.

(vi) In accordance with the notification from the user, caller's IDs and passwords are written into a supplementary information table (FIG. 8) displayed on the screen, in such a manner that the caller's IDs and/or passwords are associated with identification numbers of the NCCs with which the user made a service contract. In the present embodiment, the user's telephone number is used as the supplementary information (caller ID), so that the user's telephone number which is common to the NCCs may be written into the supplementary information table.

After receiving a reply signal from the terminal adapter 10, the server 3C of the service center 3 serves as the master, whereas the terminal adapter 10 serves as the slave. Preferably, the server 3C is connected to the terminal adapter 10 through a B channel of the ISDN network. Then, Data input into various setting fields provided in a table displayed on the screen is implemented in sequence by the staff member by manually operating the input device of the server 3C serving as the master, as explained in the above. Each time individual data is manually input, such data is written into a corresponding field in the table in the terminal adapter 10 serving as the slave. At the same time, the same data is written into the same field in an equivalent table provided in a memory device of the server 3C. In other words, the writing of table data into the terminal adapter and the server is implemented in a mirroring fashion.

The service center 3 has a function of remotely notifying the terminal adapter 10 of a new telephone number if the telephone number of any one of toll database system 4 or the like is changed. This function is useful especially for a case where area codes are changed nationwide.

In the following, operations of the terminal adapter 10 for which the setup, including the attainment of the user's local area code and the initial setting or renewal of the tables, is completed will be explained.

When the telephone 20 connected to the first or second analog port of the terminal adapter 10 is taken off-hook, the transmit/receive control section 17 of the terminal adapter 10 determines the operation mode of the telephone 20 in accordance with the operation mode table shown in FIG. 3.

Figure 5:
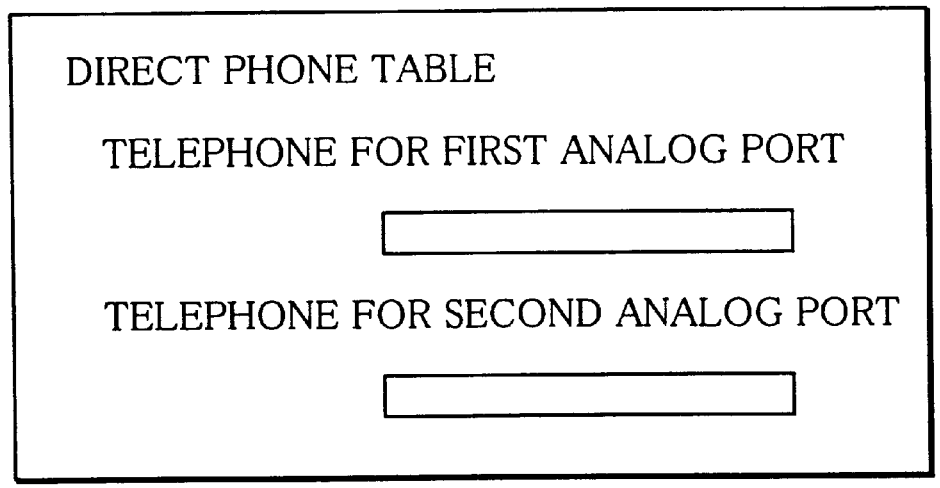
FIG. 5 is a view showing a direct phone table.
Figure 12:
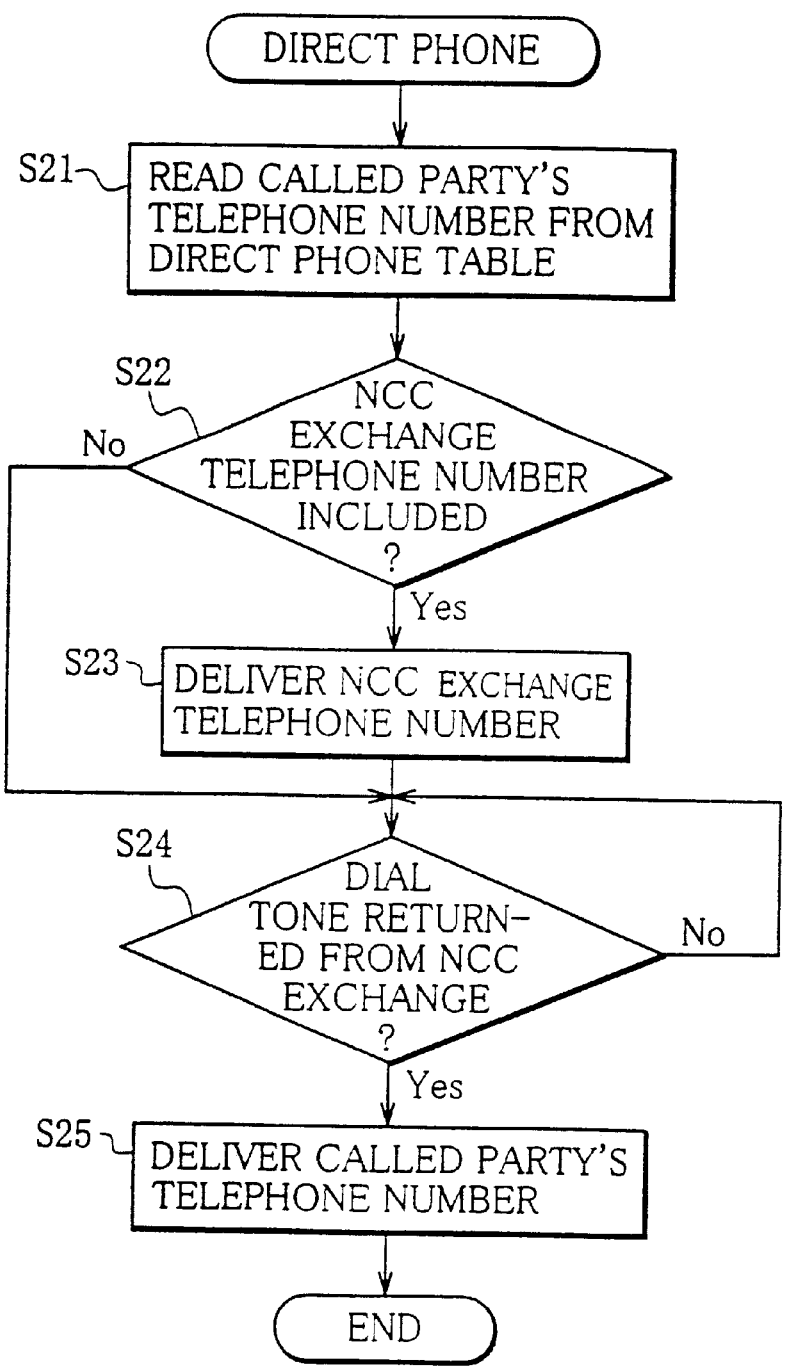
FIG. 12 is a flowchart of a telephone number delivery program executed by the transmit/receive control section in a direct phone mode.

If it is determined that the operation mode is set to the direct phone mode, the transmit/receive control section 17 reads out, as shown in FIG. 12, the called party's telephone number from the direct table of FIG. 5 and temporarily stores the same in a buffer memory (step S21). If an NCC exchange telephone number is added to the called party's telephone number, the NCC exchange telephone number is first delivered (steps S22 and S23). As a result, a telecommunication path through which the terminal adapter 10 is connected to an NCC exchange corresponding to the NCC exchange telephone number is promptly established in the public telecommunication network 1. Then, the user's telephone number is delivered from a CC exchange to the NCC exchange. The NCC exchange receives the user's telephone number as a caller ID (supplementary information) and determines whether a line connection from the telephone 20 to the NCC telecommunication network is to be accepted. If such a line connection is to be accepted, the NCC exchange delivers a dial tone indicating that the it waits for input of a called party's telephone number.

If a dial tone is returned from the NCC exchange, the transmit/receive control section 17 delivers the called party's telephone number temporarily stored in a buffer memory (steps S24 and S25), so that the telephone number delivery process at the direct phone mode is completed. Communication procedures after the telephone number delivery are the same as ordinary procedures, so that explanations thereof are omitted herein (this applies to the following operation modes).

A line connection is rejected by the NCC exchange from which a disconnection tone is returned, if the user's telephone number delivered from the CC exchange is not coincide with any one of a large number of user's telephone numbers registered as caller IDs in the NCC exchange.

In a case where a user's telephone number as a caller ID is delivered from both the CC exchange and the terminal adapter 10, a line connection is rejected when the delivered user's telephone numbers are different from each other or when they are not registered in the NCC exchange even if the delivered user's telephone numbers are consistent with each other.

Figure 13:
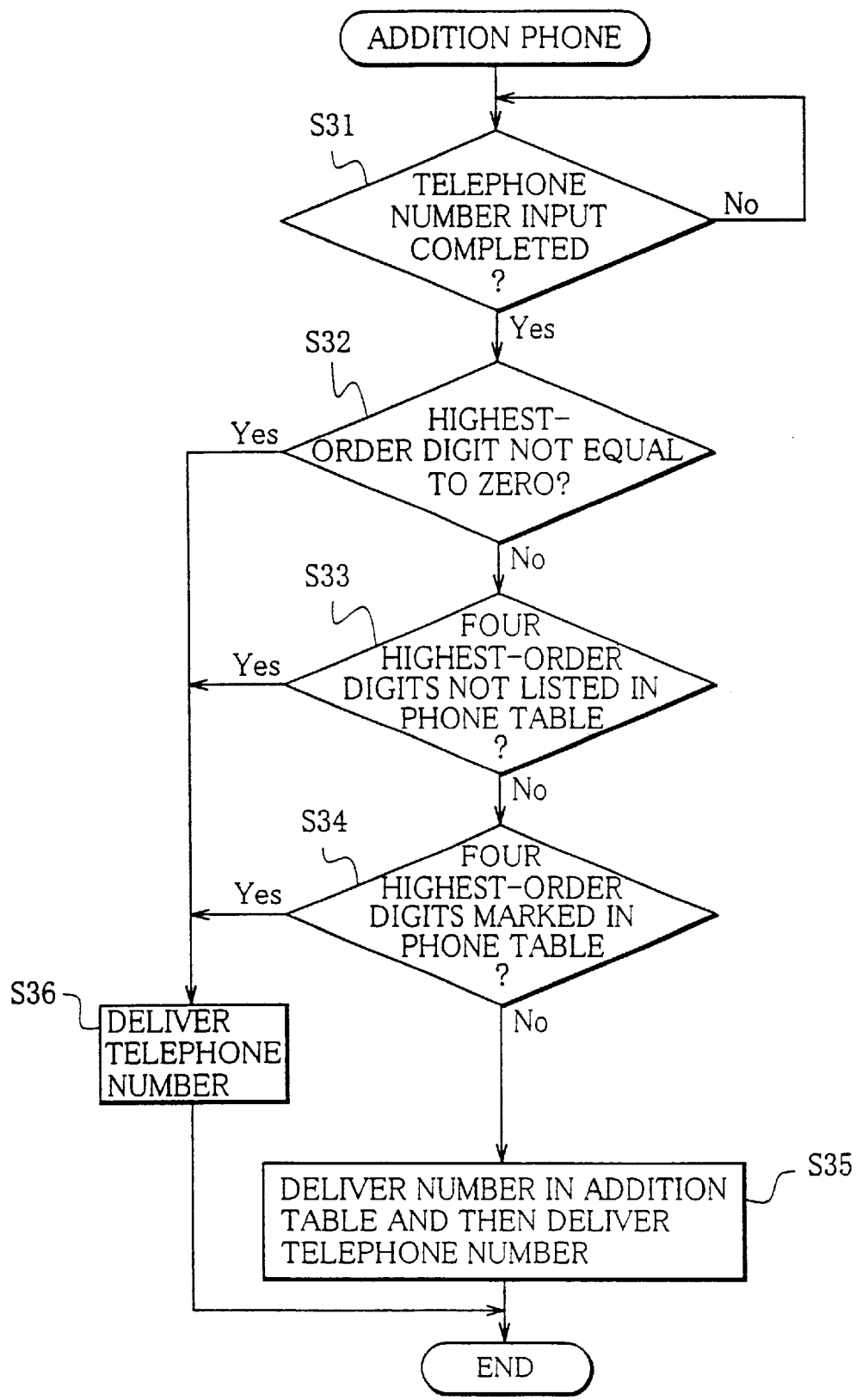
FIG. 13 is a flowchart of a telephone number delivery program for an addition phone mode.

If the operation mode of the telephone 20 is determined to be the addition phone mode when the telephone 20 is taken off-hook, the transmit/receive control section 17 of the terminal adapter 10 waits for, as shown in FIG. 13, the completion of a dial button operation on the telephone 20 to input a called party's telephone number. When the telephone number input is completed (step S31), determinations are made as to whether the highest-order digit of the telephone number is not equal to "0" and whether the telephone number or its several highest-order digits (four digits, for instance) is/are not listed or is/are marked in the phone table of FIG. 6 (steps S32 through S34). If any one of results of these determination is affirmative, the called party's telephone number which is input from the telephone 20 is delivered (step S36). In this case, a line connection to a called party's telephone is made through the public telecommunication network 1. In a case where an NCC identification number is set in advance in the addition table, a corresponding. number listed in the phone table is marked, to thereby prevent an undesired operation of delivering such an NCC identification number twice which would be otherwise be caused when the user inputs a called party's telephone number including an NCC identification number equal to the number set in the addition table.

On the other hand, all the results of the determinations at steps S32 through S34 are negative, that is, if the highest-order digit of the telephone number is "0," and the telephone number or its several highest-order digits is/are listed but is/are not marked in the phone table, the number indicated in the addition table shown in FIG. 4 is delivered, and then the telephone number input from the telephone 20 is delivered (step S35). Thus, the telephone number is delivered together with the number stored in the addition table and added to the start end of the telephone number. Typically, the number in the addition table indicates a toll area code or an NCC identification number.

If the number indicated in the addition table corresponds to an NCC exchange telephone number, such an NCC exchange telephone number is first delivered and then a called party's telephone number (which is input from the telephone 20) is delivered when a dial tone is returned from the NCC exchange, as in the case of the direct phone mode shown in FIG. 12.

In the addition phone mode, a called party's telephone number is delivered before a predetermined period of time elapses from the time when the called party's telephone number is manually input, whereby a user is prevented from making an unnecessary manual operation on the telephone 20 for reinputting a called party's telephone number.

Figure 14:
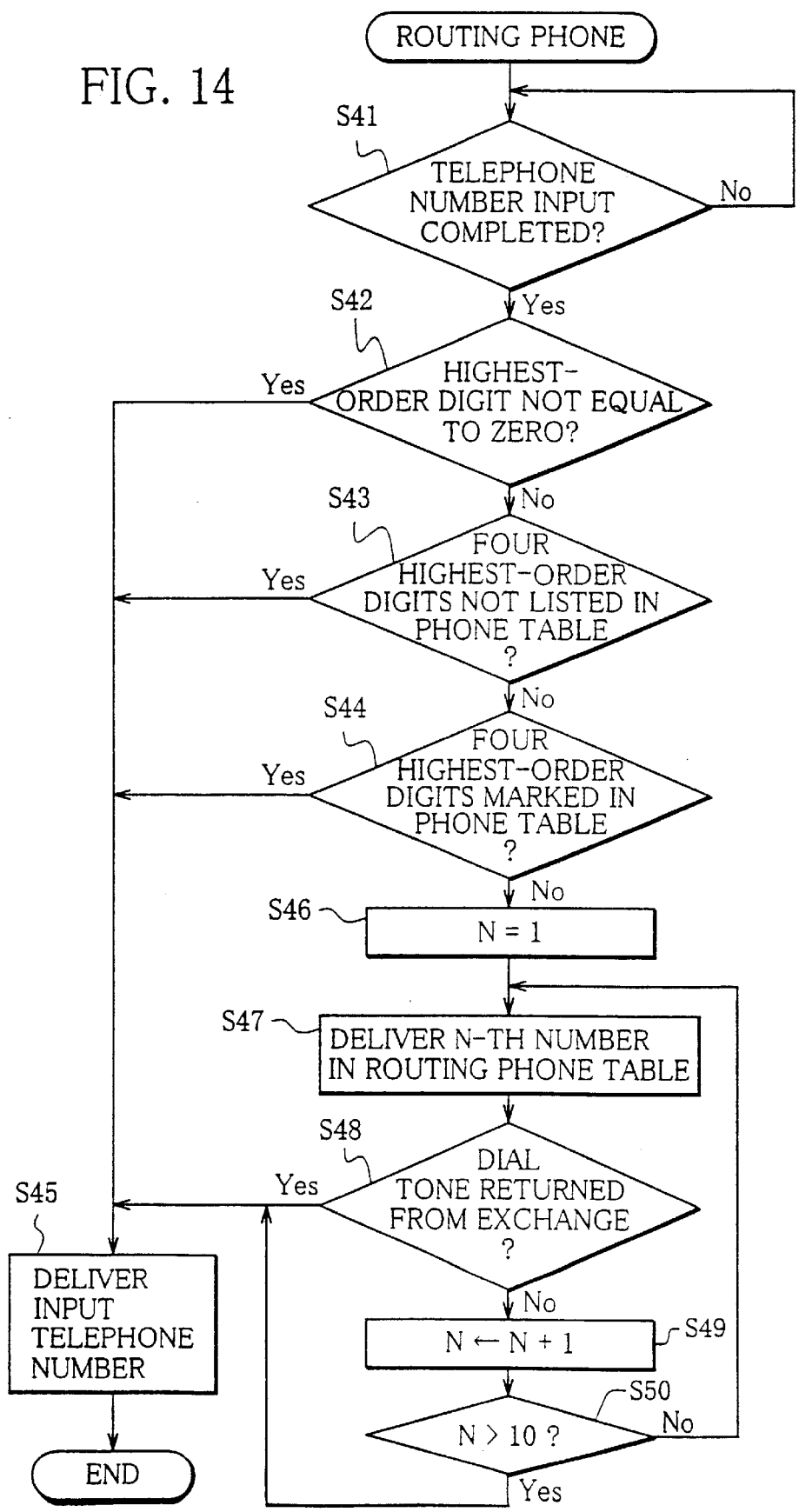
FIG. 14 is a flowchart of a telephone number deliver program for a routing phone mode with routing-order designation.

If it is determined that the operation mode of the telephone is the routing phone mode when the telephone 20 is taken off-hook, the transmit/receive control section 17 of the terminal adapter 10 determines whether the routing-order designation or the automatic routing is selected in the routing phone table shown in FIG. 7. If the routing-order designation is selected, the transmit/receive control section 17 implements, as shown in FIG. 14, steps S41 through S44 respectively corresponding to steps S31 through S34 shown in FIG. 13, and delivers a called party's telephone number which is input through the telephone 20, if the highest-order digit of the telephone number is not "0," or if the telephone number or several highest-order digits (four digits, for instance) thereof is/are not listed or marked in the phone table shown in FIG. 6 (step S45). Whereupon, the execution of this program is finished. In this case, a line connection to the called party's telephone is established through the public telecommunication network 1.

On the other hand, if the highest-order digit of the telephone number is "0," and if the telephone number or its several highest-order digits is/are listed but not marked in the phone table, a variable N in this program is set to a value of 1 (step S46), and the N-th number (here, the first number) listed in the routing phone table is delivered (step S47). Further, a determination is made as to whether a dial tone indicating that an exchange waits for input of telephone number is returned from the exchange (step S48), and if such a dial tone is returned, the transmit/receive control section 17 delivers the telephone number input through the telephone 20 (step S45). Thus, if the number listed in the routing phone table corresponds to a toll area code, the toll area code is automatically delivered in the step S47 and then a called party's telephone number is delivered. However, since a typical number listed in the routing phone table corresponds to an NCC exchange telephone number, an NCC exchange telephone number is first delivered as in the case of the direct phone mode shown in FIG. 12, and then the called party's telephone number (which is input through the telephone 20) is delivered when a dial tone is returned from the NCC exchange.

If it is determined at step S48 that no dial tone is returned form the exchange, the variable N is incremented by a value of 1, and a determination is made as to whether the renewed variable N is greater than a value of 10 (steps S49 and S50). If the renewed variable N is equal to or less than "10,"the program returns to the step S47 in which the next number listed in the routing phone table is delivered. Subsequently, the processing explained in the above is implemented. If the renewed variable N is greater than a value of 10, the telephone number input through the telephone 20 is delivered (step S51), so that a line connection via the public network 1 is started.

Alternatively, the variable N may be reset to a value of 1 when it is determined that the renewed variable N exceeds a value of 10 unless such a determination has been made a predetermined number of times, so that the numbers listed in the routing phone table may be delivered the predetermined number of times.

Figure 15:
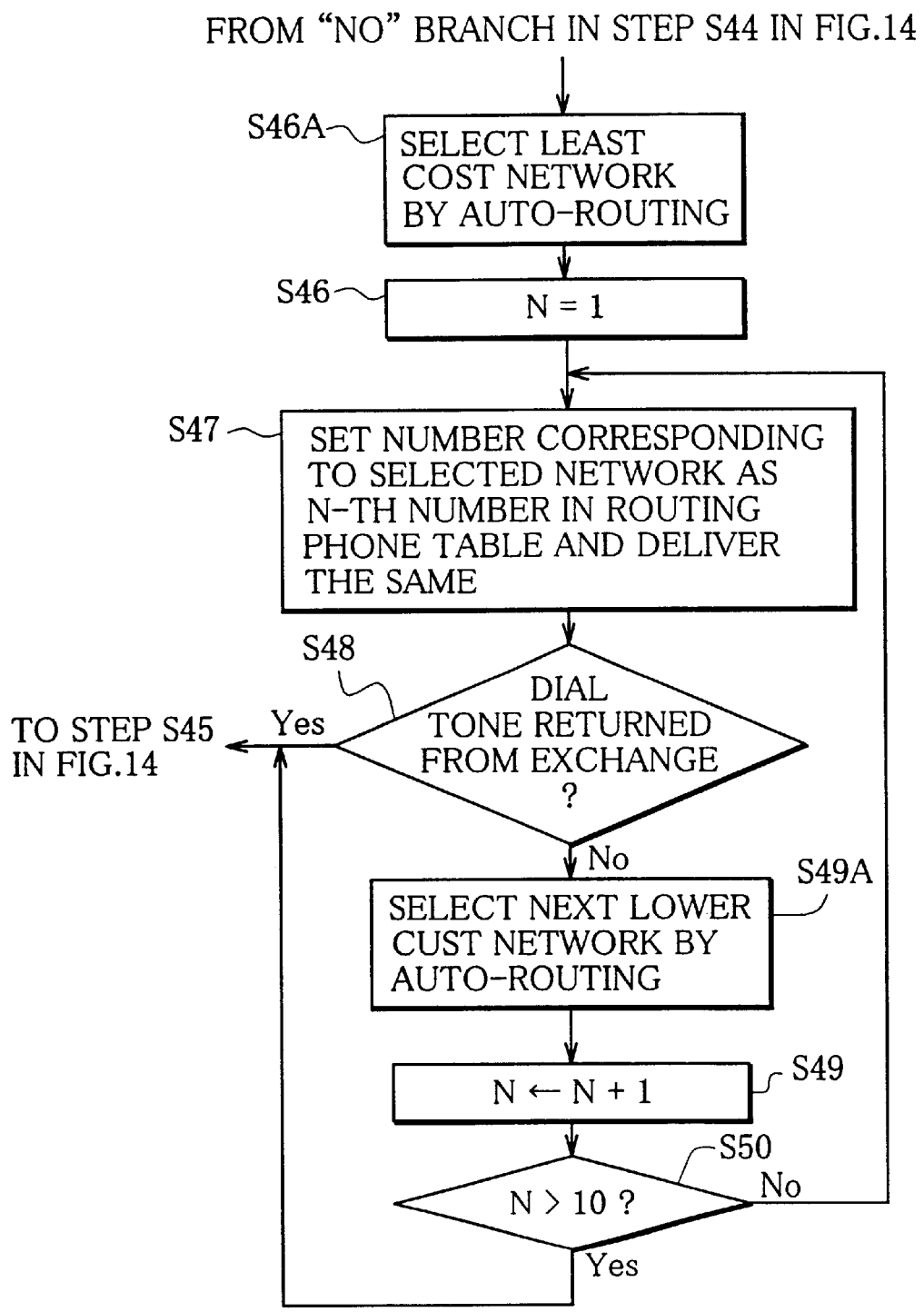
FIG. 15 is a flowchart showing part of a telephone number delivery program in a routing phone mode with automatic routing.

If the automatic routing is selected in the routing phone table, the transmit/receive control section 17 executes the processing shown in FIG. 15 which is basically the same as the telephone-number delivery processing shown in FIG. 14. However, the telephone-number delivery processing of FIG. 15 includes step S46A, provided between the steps S44 and S46, for selecting the least cost telecommunication network in term of the automatic routing based on the toll table shown in FIG. 9, and step S49A, provided between the steps S48 and S49, for selecting the next least cost network in term of the automatic routing. At step S47, a number (an NCC exchange telephone number) corresponding to the network selected in step S46A or S49A is set as N-th number in the routing phone table and is delivered.

In the automatic routing, an auto-routing log may be recorded in the memory device 19 as learning results, and the next automatic routing may made based on the auto-routing log. An optimum auto routing can be achieved by making the learning in the automatic routing in this manner.

Figure 17:
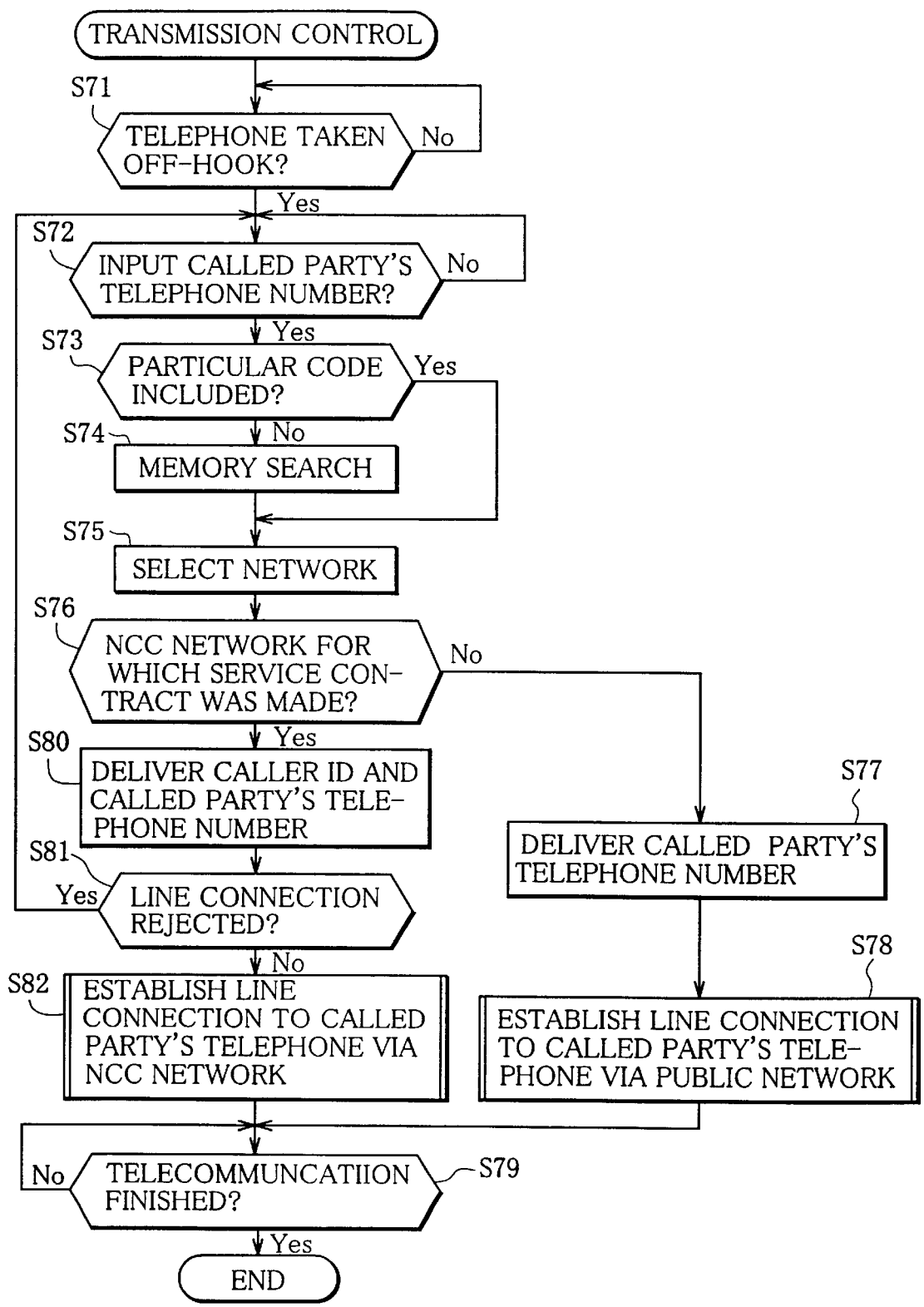
FIG. 17 is a flowchart of outgoing call control procedures executed by a terminal adapter according to a modification of the present invention.

Referring to FIG. 17, a transmission control will be explained, which the transmit/receive control section 17 of the terminal adapter 10 according to a modification of the preferred embodiment executes, while referring to the toll table of FIG. 9.

In the transmission control processing shown in FIG. 17, it is determined whether the telephone 20 is taken off-hook (step S71). When detecting that the telephone is taken off-hook, the transmit/receive control section 17 waits for the input of a called party's telephone number in term of a dial button operation on the telephone 20 (step S72), and determines whether the input telephone number indicates an NCC identification number [00XX] or a particular code such as [#] or [*] indicating that an NCC network 2A, . . . , or 2N should be utilized (step S73). This particular code may be employed as information specifying that the public telecommunication network 1 should be utilized. If no NCC identification number and no particular code is input, the toll table (FIG. 9) in the memory device 19 is searched in accordance with the input called party's telephone number and the present date/time information (step S74), and the least cost telecommunication network is selected based on search results (step S75). If an NCC identification number or a particular code is contained in the input telephone number, a corresponding network is selected (step S75).

Next, a determination is made as to whether the selected telecommunication network corresponds to any one of the NCC networks 2A–2N or the public network 1 (step S76). If it is determined that the selected network corresponds to the public telecommunication network 1, the called party's telephone number is delivered to the public telecommunication network 1 (step S77). Then, a line connection to the called party's telephone via the public telecommunication network 1 is established (step S78). Subsequently, the line connection is disconnected when the telecommunication is finished (step S79).

On the other hand, if the selected network corresponds to any one of the NCC networks 2A–2N (step S76), a caller ID such as a PIN number (the user's telephone number in the present embodiment), attained in advance under the contract between the NCC concerned and the user, is delivered to the NCC network together with the caller party's telephone number (step S80). For instance, the caller ID is delivered to an NCC exchange prior to delivery of the called party's telephone number, and in response to the delivery of the caller ID, a process (not shown) for checking the caller ID is started in the NCC exchange. Such a caller ID is registered in advance in the memory device 19 after a service contract is made between the user and the NCC concerned.

In the caller-ID checking process at the NCC exchange, a determination is made as to whether a service contract has been already made between the NCC and the user's telephone 20 specified by the caller ID (the user's telephone number). If no service contract is made, the NCC exchange naturally rejects a line connection and delivers a disconnection tone. If it is determined based on the caller ID that an outgoing call is delivered from the telephone 20 for which a service contract has been made, the NCC exchange establishes a line connection through the NCC network between the telephone 20 (terminal adapter 10) and the called party's telephone in accordance with the called party's telephone number delivered following the caller ID.

After transmitting the caller ID and the called party's telephone number to the NCC exchange in the above manner, the transmit/receive control section 17 of the terminal adapter 10 determines whether a disconnection tone is returned from the NCC exchange (step S81). When no disconnection tone is returned, a line connection to the called party's telephone is established through the NCC network (step S83). The line connection is disconnected when the telecommunication is finished (step S79).

On the other hand, if a disconnection tone is returned from the NCC exchange, information indicative of the selected network or the like is cleared. Subsequently, the procedures starting from the step S72 for waiting for the input of the called party's telephone number are implemented. In this case, the previously input called party's telephone number may be attained by a re-dial function. Learning may be made when a certain NCC exchange rejects a line connection, so that the NCC associated with the rejection is excluded from usable telecommunication networks 2A–2N. Then, any one of the other NCC networks or the public network 1 is selected. As for the public telecommunication network 1 for which the delivery of supplementary information such as the caller ID is unnecessary, a called party's telephone number is delivered, so that a line connection to a called party's telephone via the public telecommunication network may be established.

According to the modified terminal adapter serving to automatically deliver a caller ID and a called party's telephone number under the control of the transmit/receive control section 17, and ask an NCC exchange to establish a line connection via the concerned NCC network, the user is not required to input an caller ID determined in advance between the user and an NCC each time a line connection is to be established, whereby the user is relieved of burdensome labor in utilizing NCC networks. When a certain NCC network is selected, an NCC exchange is automatically notified of a caller ID, so that a line connection via the NCC network is rapidly established to improve the telecommunication efficiency.

The present invention is not limited to the foregoing preferred embodiment and its modification explained above.

For instance, in the preferred embodiment, pieces of supplementary information (caller ID and password) are listed in correspondence with NCC identification numbers in a supplementary information table of FIG. 8. Alternatively, pieces of supplementary information may be listed so as to correspond to NCC names. In this case, the memory device 19 is provided with a table in which the NCC names are listed to correspond to NCC identification numbers. The transmit/receive control section refers to the table to find an NCC identification number corresponding to an NCC name and then finds supplementary information corresponding to the NCC identification number.

The list items and the number of columns for listing NCC identification numbers shown in various tables of FIGS. 3–9 are intended to illustrative purposes only and hence may be modified in various manners. For instance, although the toll table shown in FIG. 3 is divided in accordance with utilization conditions including time classifications in term of date of a week and types of telecommunication services, the toll table may be classified in accordance with other utilization conditions.

It is not essentially required to implement the initial setting and renewal of the tables in the memory device 19 by means of remote control by the service center. The initial setting and renewal of the table can be made by executing an initial setting/renewal program stored in a floppy disk or a CD-ROM offered to an individual user with use of a personal computer connected to the serial port 24 of the terminal adapter 10.

The terminal adapter 10 may be provided with a remote control function in term of infrared rays. Such a remote control function can be activated through a telecommunication network, thereby controlling operations of various devices installed in the user's home.

What is claimed is:

1. A terminal adapter including a transmit/receive control section for controlling telecommunication between a user terminal device connected to the terminal adapter and a user terminal device of another terminal adapter line-connected to the user terminal device through a selected one of particular telecommunication networks respectively provided by a particular common carrier with which a user made a service contract, comprising:
- a memory device for storing at least one table indicating adapter-operating conditions for determining operations of the terminal adapter, in which said adapter-operating conditions includes a plurality of exchange identification numbers respectively specifying particular exchanges respectively provided in the particular telecommunication networks;
- a selector switch connected between a codec connected to a telephone and a first interface connected through a DSU section to a connection port to said transmit/receive control section to establish a line connection between said user terminal device and the user terminal device of said another terminal adapter and connected to an adapter management section to permit a server in a service center to serve as a master and the terminal adapter to serve as a slave;
- said adapter management section accessible to said memory device for causing a download memory area of the toll database system associated with any one of the plurality of particular memory devices to store therein structured toll information delivered from a common carrier when access is made from a toll database system with the intent of delivering the structured toll information,
- said adapter management section connected to the selector switch for converting the downloaded structured toll information into a toll-table form, and preparing or renewing, with use of the structured toll information converted into the toll-table form, the toll table in which structured toll information in respect of the telecommunication networks, respectively provided by a plurality of particular common carriers, are associated with network-utilization conditions and common carrier names or common carrier identification numbers; and
- said transmit/receive control section connected to said selector switch for selecting, in response to manual input of a called party's telephone number through the user terminal device, one of the plurality of particular telecommunication networks or a public telecommunication network, and reading out, when one of the particular telecommunication networks is selected, the exchange identification number corresponding to the selected particular telecommunication network from the at least one table stored in the memory device and for delivering the same.

2. The terminal adapter according to claim 1, wherein;
a particular exchange, provided in a particular telecommunication network provided in at least one of the plurality of particular common carriers, receives, as supplementary information, a user telephone number assigned to the user terminal devices, and determines whether the particular telecommunication network is useable by the user terminal device based on the user telephone number received as the supplementary information, and
when the user terminal device is taken off-hook, the user telephone number is delivered from an exchange provided in the public telecommunication network or from the transmit/receive control section which reads the user telephone number to be delivered, from the memory device of the terminal adapter.

3. The terminal adapter according to claim 1, wherein;
said memory device stores therein a supplementary information table in which a common carrier name or a common carrier identification number or an exchange identification number in respect of at least one particular common carrier is associated with supplementary information which is requested to be delivered upon utilization of a particular telecommunication network provided by the at least one particualar common carrier, and
said transmit/receive control section reads out supplementary information from the supplementary information table and delivers the same in response to a supplementary-information delivery request made by an exchange provided in the selected one of the particular telecommunication networks.

4. The terminal adapter according to claim 1, wherein;
said memory device stores therein a routing phone table in which exchange identification numbers respectively associated with the plurality of particular common carriers are listed, and
said transmit/receive control section sequentially delivers, in response to manual input of a called party's telephone number through the user terminal device 20, the exchange identification numbers in the order listed in the routing phone table until a dial tone, indicating that an exchange is ready for telephone number input, is returned from the the exchange, and delivers the manually input called party's telephone number when a dial tone is returned.

5. The terminal adapter according to claim 4, wherein;
said transmit/receive control section delivers the manually input called party's telephone number if no dial tone is returned in response to the delivery of the exchange identification number listed at the end of the routing phone table.

6. The terminal adapter according to claim 1, wherein;
said memory device stores therein a routing phone table in which exchange identification numbers respectively associated with the plurality of particular common carriers are listed and a toll table in which pieces of structured toll information in respect of telecommunication networks, respectively provided by the plurality of particular common carriers, are associated with network-utilization conditions and common carrier names or common carrier identification numbers or exchange identification numbers, and
said transmit/receive control section sequentially delivers, in response to manual input of a called party's telephone number through the user terminal device, the exchange identification numbers listed in the routing phone table in the order determined based on the toll table until a dial tone, indicating that an exchange is ready for telephone number input, is returned from the exchange, and delivers the manually input called party's telephone number when a dial tone is returned.

7. The terminal adapter according to claim 6, wherein;
said transmit/receive control section delivers the manually input called party's telephone number if no dial tone is returned in response to the delivery of the exchange identification number lastly determined based on the toll table.

8. The terminal adapter according to claim 1, wherein;
said memory device stores therein an operation mode table in which any one of a direct phone mode, an addition phone mode and a routing phone mode is indicated as a selected operation mode of the user terminal device, a direct phone table for storing therein a called party's telephone number including, where required, one or ones of a country code for international call, a toll area code, and an exchange identification number, an addition phone table for storing therein one or ones of a country code for international call, a toll area code, and a common carrier identification number, a routing phone table in which exchange identification numbers respectively associated with the plurality of particular common carriers are listed, and a toll table in which structured toll information in respect of the telecommunication networks, respectively provided by the plurality of particular common carriers, are associated with network-utilization conditions and common carrier names or common carrier identification numbers or exchange identification number, said transmit/receive control section determines the selected operation mode with reference to the operation mode table when the user terminal device is taken off-hook, said transmit/receive control section immediately delivers the called party's telephone number stored in the direct phone table if the direct phone mode is selected, the transmit/receive control section delivers, in response to manual input of a called party's telephone number through the user terminals device, the number stored in the addition phone table, and then delivers the manually input called party's telephone number, if the addition phone mode is selected, the transmit/receive control section sequentially delivers, in response to manual input of a called party's telephone number through the user terminal device, the exchange identification numbers listed in the routing phone table in the order listed in the routing phone table or determined based on the toll table, until a dial tone indicating that an exchange is ready for telephone number input is returned from the exchange, if the routing phone mode is selected, and said transmit/receive control section delivers the manually input called party's telephone number when a dial tone is returned.

9. The terminal adapter according to claim 8, wherein;

said routing phone table includes check boxes for routing-order designation and automatic routing, said transmit/receive control section sequentially delivers the exchange identification numbers listed in the routing phone table in the order listed in the routing phone table if the check box associated with the routing-order designation is marked or in the order determined based on the toll table if the check box associated with the automatic routing is marked, until a dial tone indicating that an exchange is ready for telephone number input is returned from the exchange.

10. The terminal adapter according to claim 9, wherein;

said transmit/receive control section delivers the manually input called party's telephone number if no dial tone is returned in response to the delivery of the exchange identification number listed at the end of the routing phone table or lastly determined based on the toll table.

11. The terminal adapter according to claim 8, wherein;

said memory device stores therein a phone table in which telephone numbers, for which a public telecommunication network should be utilized, or area codes including a user's local area code, or common carrier identification numbers are listed, and said transmit/receive control section delivers the called party's telephone number manually input through the user terminal device 20, without delivering a toll area code or a common carrier identification number, if the manually input called party's telephone number or its several highest-order digits is/are coincide with any one of the telephone numbers, the area codes, and the common carrier identification numbers listed in the phone table.

12. The terminal adapter according to claim 1, wherein;

when access is made from a server, provided in a service center associated with the terminal adapter, to the terminal adapter, with intention of making the initial setting or renewal of the at least one table stored in the memory device, the adapter management section delivers, through the transmit/receive control section, a reply signal indicating that access from the server to the memory device through telecommunication networks is accepted.

* * * * *